United States Patent
Johnson et al.

(10) Patent No.: US 11,823,264 B1
(45) Date of Patent: Nov. 21, 2023

(54) SYSTEM AND METHOD FOR HYBRID MULTILATERAL-BILATERAL FINANCIAL POSITION COMPRESSION

(71) Applicant: Cboe Exchange, Inc., Chicago, IL (US)

(72) Inventors: Brett Johnson, Chicago, IL (US); Robert Hocking, Downers Grove, IL (US); Michael Izhaky, Chicago, IL (US); Joseph Green, Glenview, IL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 17/350,815

(22) Filed: Jun. 17, 2021

Related U.S. Application Data (63) Continuation-in-part of application No. 17/201,702, filed on Mar. 15, 2021.

(60) Provisional application No. 63/040,350, filed on Jun. 17, 2020, provisional application No. 62/989,308, filed on Mar. 13, 2020.

(51) Int. Cl.
*G06Q 40/04* (2012.01)
*G06Q 20/02* (2012.01)
*G06Q 40/08* (2012.01)

(52) U.S. Cl.
CPC .......... *G06Q 40/04* (2013.01); *G06Q 20/023* (2013.01); *G06Q 40/08* (2013.01)

(58) Field of Classification Search
None
See application file for complete search history.

(56) References Cited

U.S. PATENT DOCUMENTS

| | | |
|---|---|---|
| 7,660,762 B1 | 2/2010 | Mellina |
| 11,231,884 B1 * | 1/2022 | Thornberg ............ G06F 3/0608 |
| 2002/0099641 A1 | 7/2002 | Mills et al. |

(Continued)

OTHER PUBLICATIONS

Chataigner, M. (2019). Credit valuation adjustment compression by genetic optimization. Risks, 7(4), 100. doi:http://dx.doi.org/10.3390/risks7040100 on Nov. 4, 2022 (Year: 2019).*

(Continued)

*Primary Examiner* — Kito R Robinson
(74) *Attorney, Agent, or Firm* — Fish & Richardson P.C.

(57) ABSTRACT

Systems and techniques are disclosed for reducing regulatory capital requirements for market participants with financial positions. Participant positions are received in a database for matching the participant positions. Additionally, participant assessed theoretical value by position, capital requirement reduction benefit for closing transactions and penalty for opening transactions by position, compression cost constraints, and zero or more custom constraints specifying acceptable risk profile in a portfolio of trades are received from each participant. A set of trades between a plurality of participants that delivers a capital requirement reduction to each of the plurality of participants, while simultaneously satisfying all participant specified cost and risk constraints is calculated. A time period to review and approve compression portfolios prior to consummating trades is provided. Trades including a multilateral compression portfolio on unanimous approval by each of the plurality of participants are automatically cleared and reported. Trade match data is calculated and disseminated.

20 Claims, 5 Drawing Sheets

(56) References Cited

U.S. PATENT DOCUMENTS

| | | | |
|---|---|---|---|
| 2002/0178102 A1 | 11/2002 | Scheinberg et al. | |
| 2004/0148249 A1 | 7/2004 | Kinnear | |
| 2014/0156492 A1 | 6/2014 | Crowley et al. | |
| 2017/0323385 A1 | 11/2017 | Sivaramakrishnan | |
| 2020/0081996 A1* | 3/2020 | Chuprun | G06F 16/1744 |
| 2021/0192504 A1* | 6/2021 | Palm | G06Q 20/389 |

OTHER PUBLICATIONS

Roy, A. (Jul. 29, 2011). CCIL launches portfolio compression services. McClatchy—Tribune Business News Retrieved from https://dialog.proquest.com/professional/docview/879681774?accountid=131444 on Nov. 4, 2022 (Year: 2011).*

United states : CME group's first multi-lateral equity options compression cycle successfully reduces nearly 590,000 contract sides. (Nov. 6, 2018). MENA Report Retrieved from https://dialog.proquest.com/professional/docview/2130149250?accountid=131444 on Nov. 4, 2022 (Year: 2018).*

[No Author], "Compression Optimization Prototype Feb. 2020 Documentation," Feb. 2020, 16 pages.

IBM [online], "IBM ILOG CPLEX Optimization Studio," Mar. 15, 2021, retrieved on Jul. 13, 2022, retrieved from URL <https://www.ibm.com/products/ilog-cplex-optimization-studio>, 8 pages.

Proquest.com [online], "BGC brokers capitalab extends its portfolio compression service to FX derivatives and interest rate caps and floors; reaches $3.5 trillion in interest rate swaptions," Nov. 22, 2016, retrieved on Apr. 27, 2023, retrieved from URL: <https://dialog.proquest.com/professional/docview/1841946222?accountid=131444>, 6 pages.

* cited by examiner

SYSTEM AND METHOD FOR HYBRID MULTILATERAL-BILATERAL FINANCIAL POSITION COMPRESSION

CROSS-REFERENCE TO RELATED APPLICATIONS

This application is a continuation-in-part of U.S. patent application Ser. No. 17/201,702, filed Mar. 15, 2021, which claims the benefit of U.S. Provisional Patent Application No. 62/989,308, filed Mar. 13, 2020, both which are incorporated herein by reference in their entirety. This application also claims the benefit of U.S. Provisional Patent Application No. 63/040,350, filed Jun. 17, 2020, which is incorporated herein by reference in its entirety.

TECHNICAL FIELD

The present disclosure relates to the trading of financial products (e.g., securities and/or derivatives). More specifically, the present disclosure relates to facilitating the automated multilateral compression of multiple market-maker position portfolios in order to maximize collective reduction of required regulatory capital and open interest in a financial product while simultaneously satisfying risk and cost constraints specified by each participant. Additionally, the present disclosure relates to a post-multilateral compression process whereby participants are provided contra position information that is used by participants to further compress residual positions bilaterally. Together, the automated multilateral compression followed by an information service that facilitates further bilateral compression provides hybrid multilateral-bilateral compression.

BACKGROUND

The Securities and Exchange Act ("SEA") Rule 15c3-1 requires market makers to maintain certain specified levels of capital to ensure that they can meet their financial obligations under all market conditions. Additionally, market makers must comply with capital requirements imposed by their clearing banks or the Option Clearing Corporation ("OCC"). A subset of market-makers that are affiliated with U.S. bank holding companies must comply with additional bank regulatory capital requirements pursuant to the Dodd-Frank Wall Street Reform and Consumer Protection Act. The Dodd-Frank rules impose higher minimum capability requirements and specifically do not permit deductions for hedged securities or offsetting options positions. Capital requirements based on these more restrictive rules are based on the aggregate notional value of short positions regardless of offsets.

SUMMARY

Participants in index options are significantly impacted by regulatory capital rules due to the generally high notional value of index options contracts and the significant number of distinct options held in participant portfolios. As a result, facilities that enable participants to reduce their portfolio net capital requirements are important to enabling participants to continuously provide liquidity to the markets they trade in, without encountering limits based on available regulatory capital. Such facilities are generally referred to as compression facilities as they generally reduce, or "compress" participant portfolios and open interest in the constituent financial products. In this context, the term "participant" may include any market participant who might wish to compress their positions. Market makers, for example, would benefit from compression facilities, but the term "participant" is not limited to market makers alone, as other types of market professionals and traders may also use and benefit from compression facilities.

Effective compression requires a forum where multiple participants participate in a multilateral process in which offsetting positions among the participants are paired off. The larger the number of participants the larger the potential for compression across hundreds or thousands of distinct constituent instruments being compressed. In a multilateral compression, each participant submits their positions in each of the constituent instruments to a system that validates and records the input. The system them computes an optimal set of trades between participants that maximizes "compression" using quantitative optimization algorithms based software running on powerful computing hardware.

Participants participate in a compression process to realize economic benefits associated with reduction of portfolio capital requirements generally by reducing the size of their portfolio of positions on which they are assessed regulatory capital to be held in reserve. While compressing portfolios presents value to participants, the process must be constrained so that certain potential negative effects of arbitrary closing (and opening) of positions are carefully managed, which include cost of compression and potential risk exposure imbalances. Participants, such as market makers, may require the ability to express constraints in their own terms to precisely specify the cost they are willing to incur and the risk exposure imbalances they are willing to accept in a compression process. Further, participants require the opportunity to review and analyze a proposed compression portfolio and to provide explicit approval prior to executing trades including a compression portfolio.

There is a need for a method and system to facilitate efficient and automated compression of position portfolios among multiple participants subject to cost constraints and arbitrarily complex constraints on risk exposure characteristics of compression trades each participant is willing to accept. Participants must be provided the opportunity to analyze and approve their portion of a multilateral compression portfolio. On unanimous approval from all participants the system efficiently and automatically consummates all trades included in the multilateral compression portfolio. Finally, following a multilateral compression, an effective compression system provides participants with information they can use to bilaterally consummate compression trades to further compress their post-multilateral compression residual positions The two forms of compression together form a hybrid multilateral-bilateral compression facility.

In more detail, according to one embodiment of the techniques disclosed herein, a computer-implemented method for hybrid multilateral-bilateral compression is implemented. The method implements workflow management system that provides mechanisms for multiple participants to submit inputs to the compression process, including positions to compress and constraints on the compression process. The system presents candidate compression portfolios to participants with detail sufficient for participants to confirm the value delivered and that all constraints are satisfied. A workflow process is implemented that enables detection of unanimous approval of a candidate compression portfolio, after which the system consummates trades including the compression portfolio. In the event that one or more participants does not approve the candidate compression portfolio, the system presents new candidate compression portfolio to participants in an iterative manner until unanimous approval is achieved, or fewer than two participants remain. Further a system imposed limit on the number of compression attempts may be imposed. Following the conclusion of the automated multilateral compression process, the disclosed techniques can implement a process and workflow that computes and disseminates data ("match data") to each participant that identifies opportunities for further bilateral compression on post-multilateral compression residual positions. Participants use match data to bilaterally consummate transactions that further compress their positions.

The disclosed techniques can apply advanced analytics implemented in software on computing hardware to derive multiple candidate multilateral trades that maximize value delivered to participants while satisfying every constraint specified by every participant. The scale of the underlying analytical problem to solve and the limited time in which calculations must be completed to present a practical service requires a platform capable of parallel computation of portfolios using multiple algorithms. The disclosed techniques embody a core algorithm, a secondary algorithm, and a general framework to plug in additional algorithms. The disclosed techniques introduce analytical methods for computing baseline theoretically possible compression metrics on both a per-participant and global basis that are used for benchmarking the compression quality and for use in convergence detection and assessment during the analytical phase of the compression.

The disclosed techniques can apply obfuscation methods that ensure that participants are not able to know the specific method of computing multilateral compression portfolios for any single compression. Multiple methods can be defined and randomly applied so that participants cannot use a specific computation method to consistently influence the process in their favor.

BRIEF DESCRIPTION OF THE DRAWINGS

FIG. 1 is an example structure and content of position and constraint information provided to a compression system by participants.

DETAILED DESCRIPTION

The embodiments of the present disclosure can be used to realize multilateral compression of positions in a class of financial instruments among multiple participants with offsetting positions, followed by dissemination of post-compression information that is used for further compression using bilaterally consummated trades, thus forming a hybrid multilateral-bilateral compression method and system.

Participants engage in a compression process to realize economic benefits associated with reduction of portfolio capital requirements generally by reducing the size of their portfolio of positions on which they are assessed regulatory capital to be held in reserve. While compressing portfolios presents value to participants, the process must be constrained so that certain potential negative effects of arbitrary closing (and opening) of positions are carefully managed, which include cost of compression and potential risk exposure imbalances.

Compression transactions are consummated at a price ("compression price") that represents an independent fair value assessment of each instrument traded. The extent to which the compression price deviates from a participant's fair value assessment, trades incur a cost to the participant. For example, if a participant buys an instrument to close a short position at a compression price that is higher than their internal assessment of fair value of the instrument, the transaction incurs a cost (deficit). On the other hand, if the compression price is lower than their internal assessment of fair value of the instrument, the transaction incurs a positive value (credit). The sum of such deficits and credits across all of the transactions for a participant in a compression portfolio represents the total cost of compressing to the participant, which can be positive (debit) or negative (credit). Participants require the ability to constrain the degree to which compression can incur a significant deficit. In other words, participants require the ability to specify a maximum, or a cap, on the cost (debit) of a compression. In addition to a cap on the cost of a compression, participants must also be provided with the ability specify a cap on the cost per unit of capital requirement reduction in the event that the total cost cap is not exceeded.

Another potential negative outcome of compression is the creation of unwanted or unbalanced market exposures resulting from an arbitrary set of trades that maximize the amount capital requirement reduction but don't take into account the need for a participant's exposure to remain balanced in a manner specified by the participant. For example, a participant may wish to maximize reduction in capital requirements associated with a portfolio of positions while at the same time remaining market neutral with respect to one or more metrics within bounds specified by the participant. The meaning of "market neutral" is participant-specific. The potential variation in the form and manner in which a participant may wish to specify "market neutral" are limitless. For example, a participant may wish to constrain the long-short ("delta") exposure to an underlying instrument variation of the entire portfolio to within certain lower and upper values, while at the same time constraining the delta exposure of subsets of the portfolio based on time-to-maturity ("tenor") to subset-specific lower and upper bounds. The partitioning of positions on which market exposure constraints can be specified is limitless including by moneyness, moneyness and tenor, notional value, delta and countless others. Participants require an unrestricted and completely flexible ability to specify bounds on risk exposures, expressed in their specific terms, resulting from a portfolio of trades assigned in a multilateral compression.

FIG. 1 is an embodiment of content provided by participants to express the positions they wish to submit for compression. Each position entry uniquely identifies the instrument and the quantity held by the participant, long or short. The participant provides their assessment of fair value of each instrument ("theo") which is used to compute the cost to the participant for each trade and the compression portfolio as a whole using quantity weighted differences between compression prices and participant specified theoretical prices. Participants specify the capital reduction benefit for closing existing positions as well as the capital reduction penalty (i.e., increase) associated with adding new positions or exacerbating existing positions (i.e., adding to an existing long or short position to increase the degree to which the participant is long or short respectively). These values are used in the calculation of trade and portfolio level capital requirement reduction. An extensible specification structure allows participants to specify any number of participant-defined risk exposure constraints. Participants define an additional column which effectively adds an additional field to each position specification. A zero value indicates that the position does not contribute to the risk constraint. Participants specified minimum and maximum bounds on each risk constraint which specify minimum and maximum values for the traded quantity weighted sum of the constraint (which may be zero) across all instruments in the input specification. Using this flexible architecture, participants can define any risk constraint in their own terms and units and applied to any subset of positions in the input submission, including all positions.

An effective multilateral compression facility must accept the specification of a portfolio of positions and cost and exposure constraints, specified in participant terms, from multiple participating participants. The collective set of positions and constraints from all participants generally includes a massive and enormously complex optimization problem involving potentially hundreds of thousands of decision variables (i.e., contracts traded by each participant in each instrument) and thousands of constraints that express that balance of buyers and sellers in the compression portfolio and all participant specified cost and risk exposure constraints. An analytical architecture using advanced optimization algorithms on high-performance computing hardware is used to derive candidate portfolios that collectively maximize the capital requirement reduction for all participants while satisfying all participant specified constraints.

The advanced optimization algorithms used to derive candidate portfolios use an objective function to guide the comparative analysis of portfolios when exploring the infinite space of candidate portfolios. Multiple objective functions can be used to drive the analytical process toward the optimal or "best" portfolio among an infinite space of portfolios that deliver value and satisfy constraints. The least complex objective function is to maximize total quantity executed. The volume-based objective function generally delivers capital requirements reduction but does so indirectly and does not attempt to maximize value delivered, but rather only volume executed. Another objective function seeks to maximize total value delivered, which is equivalent to maximizing volume scaled by participant specified value associated with closing or penalty associated with opening positions in each instrument. More complex objective functions that proportionally weight maximizing value delivered with the distribution of value, the distribution of cost incurred, and other allocation metrics can be used to direct the analytical process toward a balance of total value and value allocation.

The scale and complexity of the analytical problem is sufficiently large that, even with massive computing resources, convergence to optimality is generally not possible within a reasonable amount time that would be required in practice. The analytical problem must generally be time-boxed ("compression window") in such a way that the best solution available in a certain amount of time will be selected for presentation to participants. As a result, a system and methodology that runs multiple formulations of the optimization problem using distinct objective functions running in parallel can be used to provide multiple alternative portfolios for selection and presentation to participants the end of the compression window that all provide value and satisfy constraints. The relative rate of convergence to optimality of each formulation is a function of the specific participant positions and constraints, thus running multiple formulations in parallel maximizes the chance that a quality candidate will be available at the end of a finite compression window.

Once a candidate multilateral compression portfolio including trades between participants is identified, all participants must be given the opportunity to examine the set of trades including the portfolio in which they are a party. Participants use the traded quantities in each of the instruments to replicate the cost and constraint values associated with their portion of the portfolio and to perform participant-specific analyses on the portfolio to confirm that all constraints are met. Each participant must positively confirm that their portion of the overall compression portfolio meets their criteria before a single transaction including the portfolio is consummated. The reason is that the collective set of trades in the compression portfolio form a tightly coupled set of position transfers that together move quantities amount the group of participants in a manner that meets all participant cost and risk constraints while maximizing total value delivered to all participants. Removal of the trades associated with one or more participants generally upsets the balance of position and risk transfer such that the constraints are no longer met. As a result, all participants must agree to their portion of the compression portfolio prior to consummating the trades included in the portfolio.

Figure 2:
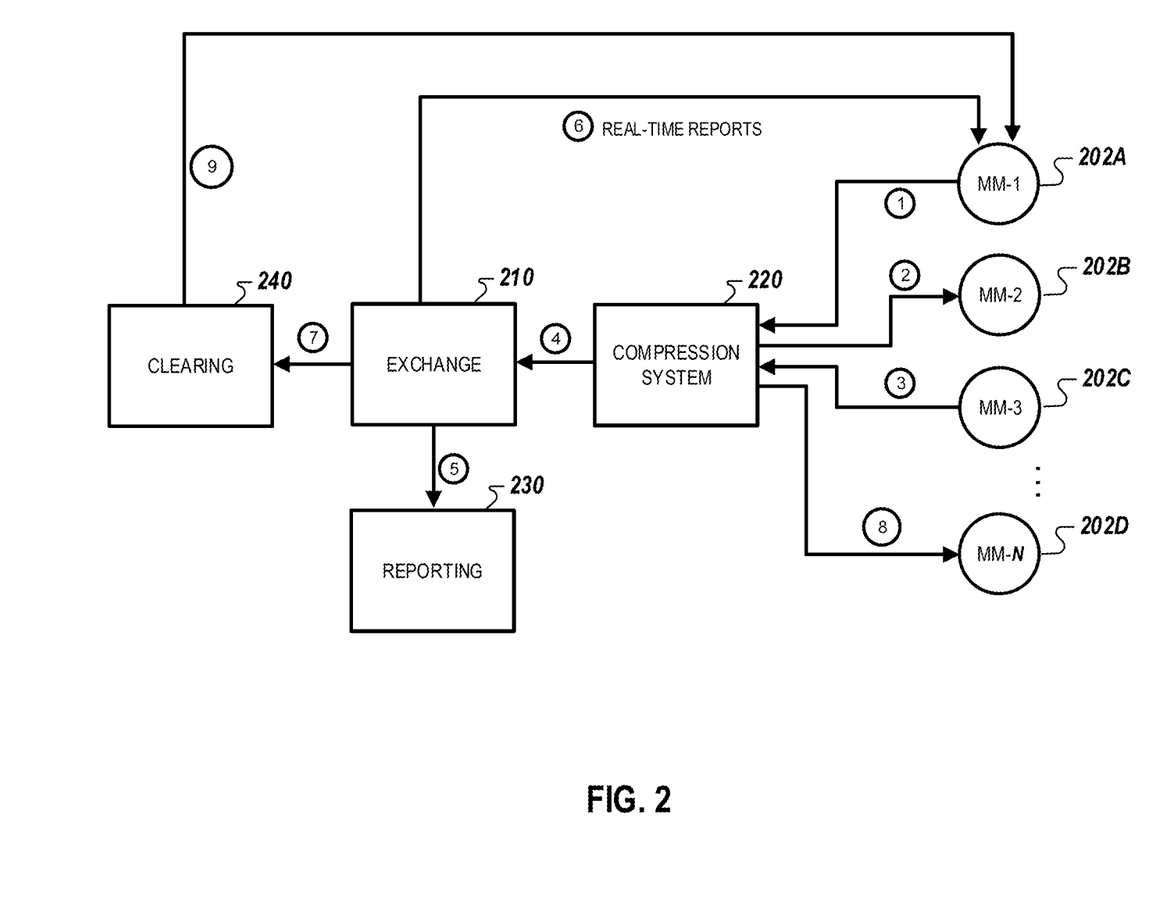
FIG. 2 is a system diagram of an example method for executing a hybrid multilateral-bilateral compression process.

FIG. 2 is an exemplary implementation of a hybrid multilateral-bilateral compression system and workflow. At step 1, participants 202A, 202B, 202C, 202D (MM-1, MM-2, . . . , MM-N) submit inputs to the compression process representing positions they wish to compress in order to reduce capital requirements, and constraints that express limits on cost and resulting exposure they are willing to accept in the compression. Compression system 220 directs the execution of analytics to determine a candidate multilateral compression portfolio which is presented to each participant. At step 2, each participant receives a subset of the multilateral compression portfolio representing the trades in which they are a party and information detail required to confirm their constraints are met and to evaluate capital requirement relief delivered. At step 3, each participant submits their approval of their portion of the multilateral compression portfolio. At step 4, the compression system 220, upon detecting unanimous approval of the multilateral compression portfolio from all participants, submits trade information including the portfolio to the exchange for processing to an exchange 210. At step 5 the trades including the compression portfolio are reported to market 230 through regulatory reporting interfaces and data feeds that contain messages representing each trade executed on the exchange 210. At step 6, each participant is provided with reports detailing each trade executed in the compression portfolio to which they are a party. At step 7 the trades including the compression portfolio are communicated to a clearing system 240 that performs clearing functions. At step 8 participants are provided with data ("match data") detailing other participants in the group with which they can trade bilaterally to further compression residual positions remaining after the multilateral compression. The match data includes outright position crosses as well as opportunities to cross packages of positions, known as structures, including spreads, combos, boxes and others. At step 9 participants receive standard messaging and reporting from the clearing system 240 with trade information cleared as part of the multilateral compression.

Figure 3:
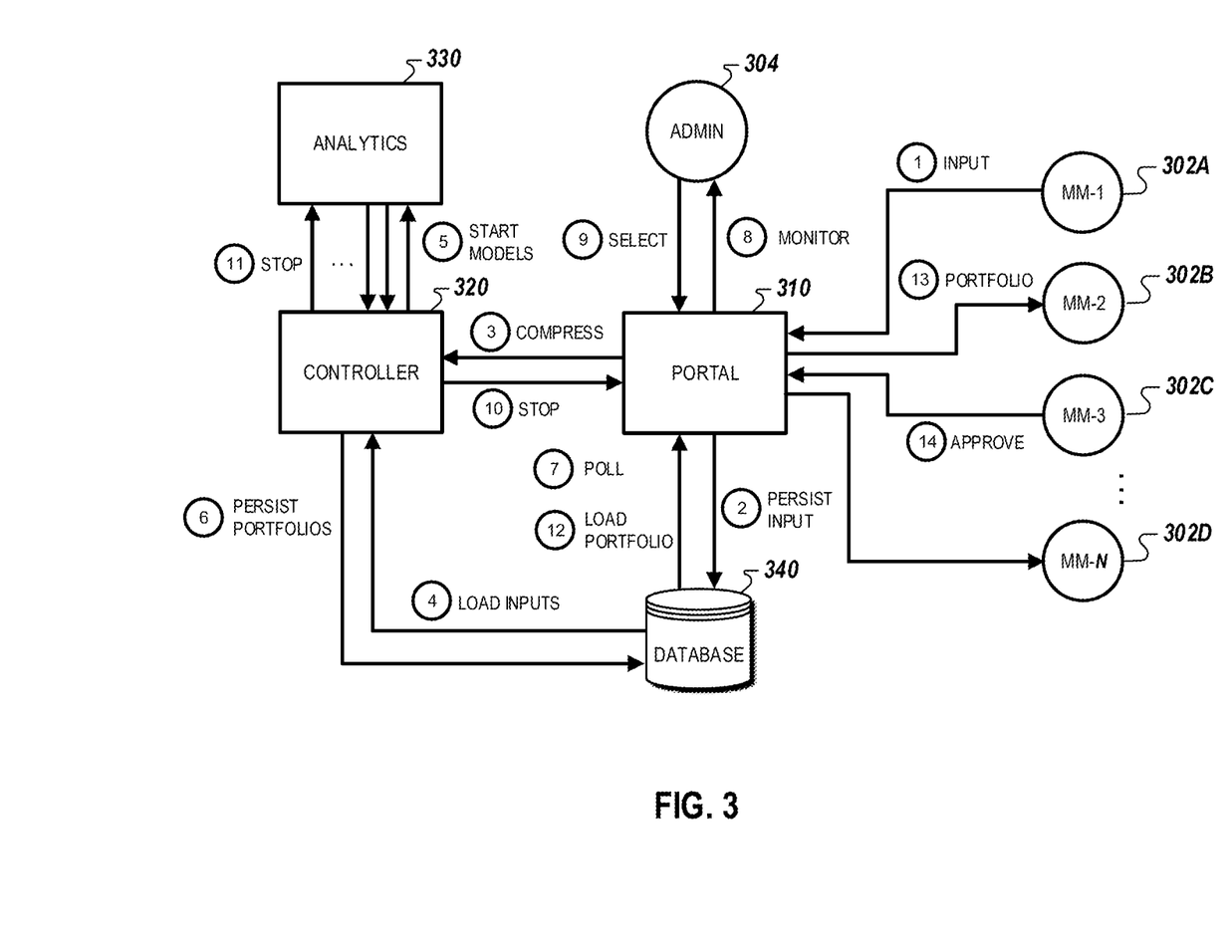
FIG. 3 is a system diagram illustrating an exemplary embodiment of analytical processes including the derivation of compression portfolios and workflow enabling participants to review and approve proposed compression portfolios.

FIG. 3 represents an embodiment of a system that executes one or more algorithms in parallel to derive candidate compression portfolios. At step 1, multiple participants 302A, 302B, 302C, and 302D (MM-1, MM-2, . . . , MM-N) interact with the compression system through a portal 310 and provide inputs on the portal 310. At step 2, portal 310 stores input data in a database 340. At step 3, portal 310 directs a compression controller ("controller") 320 to start computing portfolios which are persisted to a database 340 which is monitored by the portal 310. At step 4, portal 310 loads inputs from database 340 into controller 330. At step 5, controller 320 starts models using an analytics module 330. At step 6, controller 320 persists portfolios in database 340. At step 7, portal 310 polls intermediate portfolios based on information in database 340. At step 8, an administrator facility 304 associated with the portal 310 monitors intermediate portfolios. At step 9, administrator facility 304 selects a candidate multilateral compression portfolio at which time the analytics in-progress are stopped (steps 10 and 11). The administrator facility selection process may be manual or automated. At step 12, portal 310 constructs information to be disseminated to each participant presenting their portfolio of the multilateral compression portfolio with detail confirming total capital requirement reduction and evidence that all specified constraints have been satisfied. At step 13, portal 310 notifies participants that compression portfolio data are available for download and analysis. At step 14, the portal 310 implements an interface through which participants indicate their acceptance of the compression portfolio.

In the event that one or more participants do not approve their portion of a compression portfolio, the collective set of trades must be disqualified as a valid compression candidate because it can no longer be guaranteed to meet all participant specified constraints. As a result, a new compression portfolio computation process can be executed that removes the non-approving participants from the optimization problem to form a new candidate compression portfolio that both maximizes collective value while satisfying all constraints of the remaining participants. Remaining participants must all approve their portion of the candidate compression portfolio before trades can be consummated. If one or more participants do not approve their portion of the portfolio, the cycle begins again with remaining approving participants. The cycle continues until all participants approve, the number of participants drops below two, or a system imposed number of cycles is exceeded.

Figure 4:
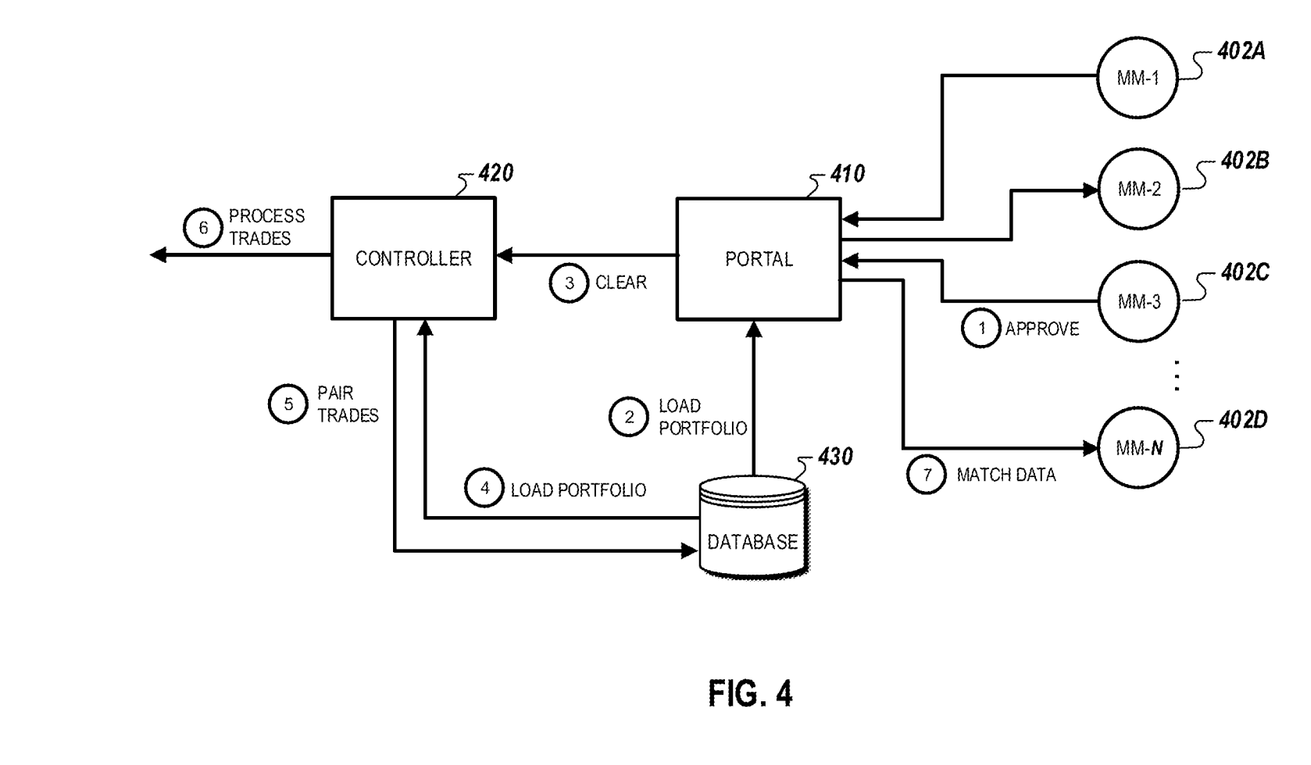
FIG. 4 is a system diagram illustrating an exemplary embodiment of post-approval workflow and transformation of an approved portfolio into distinct trades including the compression portfolio to be processed by an exchange.

FIG. 4. presents an embodiment of steps that occur following unanimous approval of a multilateral compression portfolio by multiple participants 402A, 402B, 40C, and 302D (MM-1, MM-2, . . . , MM-N). When all participants have approved a portfolio, portal 410 notifies an controller 420 that the multilateral compression portfolio has been unanimously approved and the constituent trades can be consummated. The controller 420 loads the approved portfolio definition from the data store, which includes the traded quantities by each participant in each instrument within the compression. The controller 420 constructs two-sided trades by pairing buyers and sellers on each instrument, then provides the details of the entire set of two sided trades including long participant, short participant, traded quantity, compression price and clearing details of both participants.

Figure 5:
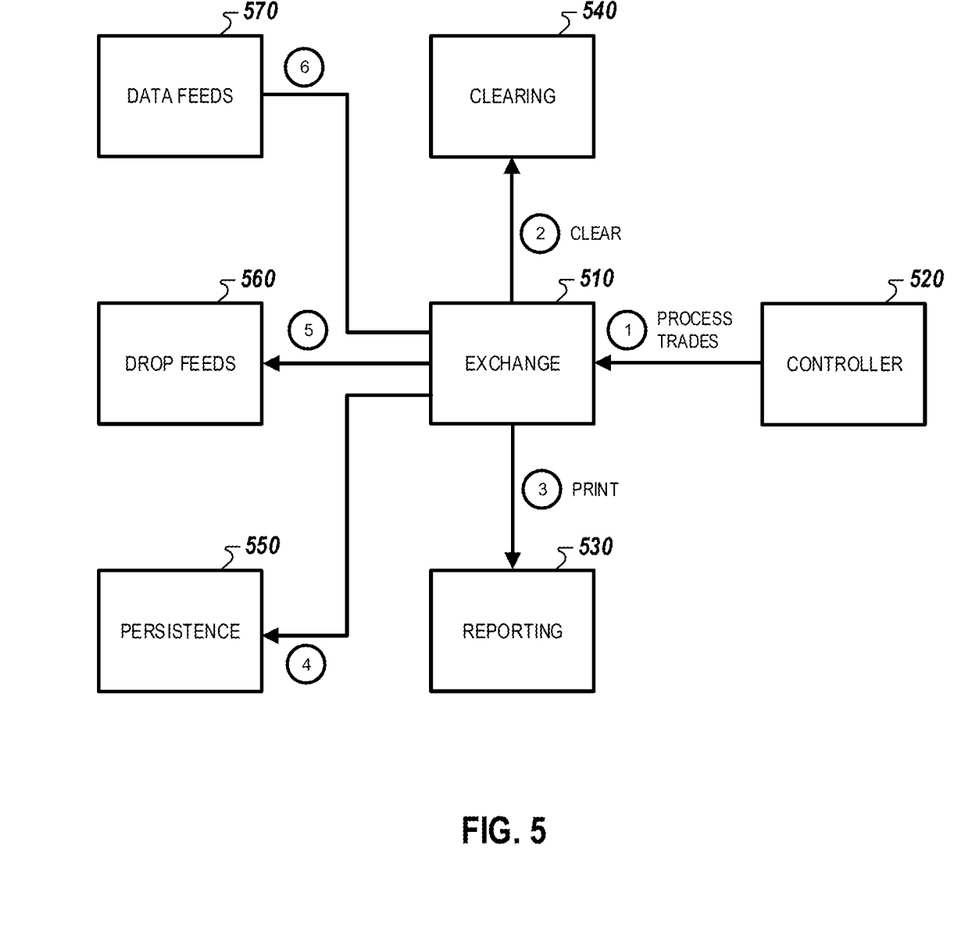
FIG. 5 is a system diagram illustrating an exemplary embodiment of processing of trades resulting from a successful multilateral compression.

FIG. 5. Presents an embodiment of steps that occur when an approved multilateral compression portfolio is presented to an exchange 510 as a set of two-sided trades to be processed. Each trade is summited to a trade clearing service 540 provided for clearing. Each trade is submitted to a reporting service 530 as required for transparent market-wide dissemination of trades. Trade details are persisted at 550 as required for financial reporting, record-keeping, participant daily and end of month trade reporting and other purposes. Trades are sent out to drop feeds 560, which provide participants and their clearing service providers real-time reporting of executed trades on the exchange involving the individual participant. Lastly, trades are reported to exchange data feeds 570 to provide details to subscribers of all trades executed on the exchange.

The compression performance described throughout this disclosure can in some cases be implemented in a manner dependent on an aggregate set of positions, constraints, and specified close benefit and open penalties specified by all participants. The potential for a multilateral compression process to reduce capital requirements for all participants is difficult to quantify as it is a function of both the crossable positions represented in the combined set of participants coupled with the complete set of participant-specific constraints. The degree to which each participant constrains their specification of acceptable portfolios in cost and risk exposure terms, limits the total potential of the compression process to create value for each participant and for the set of participants as a whole. As a result, an important part of a compression process is a means to quantify the limits to the potential value delivered to each individual participant as well as the total value delivered to combined set of participants resulting from the combined set of positions and constraints participating in a compression.

The potential of an individual participant to realize value in a compression is a function of their positions and expressed cost and risk exposure constraints. The maximum possible value that a participant can realize from a compression is revealed by performing a hypothetical compression analysis in which the participant is paired off against a hypothetical portfolio including the exactly opposite sign and equal magnitude position sizes but with no specified constraints (i.e., unconstrained). If the participant had specified no constraints, then the process would pair off all positions for a one hundred percent compression efficiency. However, as a result of cost and risk exposure constraints, a subset of the participants positions will be crossed in this process. The result is the maximum possible value that can be delivered to an individual participant in the multilateral compression process in both capital requirement reduction and quantity executed terms.

The potential of the overall compression process to deliver value to all participants collectively is more challenging than quantifying individual participant maximum value. The maximum volume that can be executed across all participants without considering constraints can be computed by summing the minimum absolute value of total long and total short positions on the union of all instruments in a compression. This value is the maximum total quantity that could be executed in a compression. It is a conservative value since constraints are not considered. Nevertheless, the maximum quantity is an effective benchmark at measuring the degree to which a multilateral compression result approaches an unconstrained theoretical maximum in quantity terms.

At the conclusion of a multilateral compression, participants are left with residual positions that were submitted to for compression but were not crossed in compression portfolio. There remains value to participants in further compressing their positions despite the multilateral compression having concluded. A hybrid multilateral and bilateral compression system provides participants with the option of providing information ("match files") to other participants that can be used to bilaterally consummate compressing transactions based on crossing analysis of their post-compression residual positions. Participants that opt-in to participating in the bilateral phase of a hybrid compression service receive match files that present participants that have opposite side positions in the compression instruments with whom they could trade bilaterally to further reduce capital requirements. Match files specify outright instrument position trade opportunities as well as opportunities to trades structures including call and put spreads, combos, box spreads and other configurable structures as appropriate for the instruments being compressed. Having been provided with match files, participants bilaterally consummate compression trades directly with participant counterparties.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. A method of trading in a computer, the method comprising:

receiving, by the computer comprising a controller and a database and from one or more user devices, position data from a plurality of market participants, the position data comprising cost and risk exposure constraints;

matching, via the computer, position data from one of the plurality of market participants to position data from another one of the plurality of market participants, wherein the matching provides a reduction of portfolio capital requirements for the plurality of market participants;

determining, by a controller, a maximum cost and a maximum cost per unit of capital requirement reduction, wherein the maximum cost and the maximum cost per unit are applicable to a compression cost, wherein the compression cost is a difference between a compression price and a fair value that is assessed by each of the plurality of market participants;

assigning, by the controller, one or more of a capital requirement reduction value for a closing transaction and a penalty value for an opening transaction for each position represented in position data of the plurality of market participants, to quantify trade contribution from each of the plurality of market participants to the capital requirement reduction resulting from a compression portfolio;

determining, by the controller, one or more of a minimum value and a maximum value of zero or more risk constraints on the compression portfolio, wherein each of the zero or more risk constraints are applicable to all or a subset of compression positions associated with one or more market participants;

determining, utilizing the controller, a set of trades between the plurality of market participants that delivers capital requirement reduction to each of the plurality of market participants, the set of trades satisfying all constraints specified by each of the plurality of market participants;

providing generating, utilizing the controller, for each of the plurality of market participants, a time period to review and approve compression portfolios prior to consummating the set of trades;

generating, utilizing the controller, one or more portfolios for selection and presentation to the plurality of market participants at an end of the time period, the one or more portfolios comprising data indicative of the risk exposure constraints for the plurality of market participants;

clearing and reporting the set of trades, using the computer, in response to unanimous approval by the plurality of market participants;

determining, by the controller, trade match data representative of opportunities to trade with individual counterparties on each position remaining in a portfolio belonging to at least one of the plurality of market participants; and transmitting, by the computer, the trade match data to the plurality of market participants in response to clearing and reporting the set of trades.

2. The method of claim 1 further comprising implementing the ability of market participants to specify a variable number of participant-defined portfolio risk constraints in a form and manner chosen by the market participants.

3. The method of claim 1, further comprising iteratively recalculating the compression portfolio if one or more of the plurality of market participants rejects a presented candidate portfolio.

4. The method of claim 1, further comprising proactively pre-calculating multilateral compression portfolios including only a subset of the plurality of market participants to enable timely presentation of an alternative candidate portfolio if one or more of the plurality of market participants rejects a candidate compression portfolio.

5. The method of claim 1, further comprising deploying a plurality of computational algorithms running in parallel to reduce the time required to derive candidate compression portfolios.

6. The method of claim 1, further comprising specifying instruments on which a participant will accept existing positions to be reduced or increased or new positions to be established.

7. The method of claim 1, further comprising implementing an algorithmic calculation for each participant of the maximum possible capital requirement reduction and executed quantity that can be achieved irrespective of other participant inputs.

8. The method of claim 1, further comprising implementing an algorithmic calculation of the maximum executed quantity all participant inputs considered.

9. The method of claim 1, further comprising specifying an algorithm used for efficiently computing multilateral compression portfolios comprising closing only transactions.

10. The method of claim 1, further comprising specifying an algorithm used for efficiently computing multilateral compression portfolios comprising both closing and opening positions.

11. The method of claim 1, further comprising algorithm obfuscation that renders the exact method by which compression portfolios are computed and benefit is allocated unknowable by observing system operation.

12. The method of claim 1, further comprising implementing computation and dissemination of match data for combinations of positions representing commonly traded structures.

13. The method of claim 1, wherein the set of trades are included in a multilateral compression portfolio.

14. The method of claim 1, wherein trade match data representative of opportunities to trade bilaterally with the individual counterparties on each of the position remaining in the portfolio.

15. A system comprising one or more computers and one or more storage devices on which are stored instructions that are operable, when executed by the one or more computers, to cause the one or more computers to perform operations comprising:

receiving, by the computer comprising a controller and a database and from one or more user devices, position data from a plurality of market participants, the position data comprising cost and risk exposure constraints;

matching, via the computer, position data from one of the plurality of market participants to position data from another one of the plurality of market participants, wherein the matching provides a reduction of portfolio capital requirements for the plurality of market participants;

determining, by a controller, a maximum cost and a maximum cost per unit of capital requirement reduction, wherein the maximum cost and the maximum cost per unit are applicable to a compression cost, wherein the compression cost is a difference between a compression price and a fair value that is assessed by each of the plurality of market participants;

assigning, by the controller, one or more of a capital requirement reduction value for a closing transaction and a penalty value for an opening transaction for each position represented in position data of the plurality of market participants, to quantify trade contribution from each of the plurality of market participants to the capital requirement reduction resulting from a compression portfolio;

determining, by the controller, one or more of a minimum value and a maximum value of zero or more risk constraints on the compression portfolio, wherein each of the zero or more risk constraints are applicable to all or a subset of compression positions associated with one or more market participants;

determining, utilizing the controller, a set of trades between the plurality of market participants that delivers capital requirement reduction to each of the plurality of market participants, the set of trades satisfying all constraints specified by each of the plurality of market participants;

generating, utilizing the controller, for each of the plurality of market participants, a time period to review and approve compression portfolios prior to consummating the set of trades;

generating, utilizing the controller, one or more portfolios for selection and presentation to the plurality of market participants at an end of the time period, the one or more portfolios comprising data indicative of the risk exposure constraints for the plurality of market participants;

clearing and reporting the set of trades, using the computer, in response to unanimous approval by the plurality of market participants;

determining, by the controller, trade match data representative of opportunities to trade with individual counterparties on each position remaining in a portfolio belonging to at least one of the plurality of market participants; and transmitting, by the computer, the trade match data to the plurality of market participants in response to clearing and reporting the set of trades.

16. The system of claim 15, further comprising iteratively recalculating the compression portfolio if one or more of the plurality of market participants rejects a presented candidate portfolio.

17. The system of claim 15, further comprising deploying a plurality of computational algorithms running in parallel to reduce the time required to derive candidate compression portfolios.

18. The system of claim 15, further comprising specifying instruments on which a participant will accept existing positions to be reduced or increased or new positions to be established.

19. One or more non-transitory computer storage media encoded with instructions that, when executed by one or more computers, cause the one or more computers to perform operations comprising:

receiving, by the computer comprising a controller and a database and from one or more user devices, position data from a plurality of market participants, the position data comprising cost and risk exposure constraints;

matching, via the computer, position data from one of the plurality of market participants to position data from another one of the plurality of market participants, wherein the matching provides a reduction of portfolio capital requirements for the plurality of market participants;

determining, by a controller, a maximum cost and a maximum cost per unit of capital requirement reduction, wherein the maximum cost and the maximum cost per unit are applicable to a compression cost, wherein the compression cost is a difference between a compression price and a fair value that is assessed by each of the plurality of market participants;

assigning, by the controller, one or more of a capital requirement reduction value for a closing transaction and a penalty value for an opening transaction for each position represented in position data of the plurality of market participants, to quantify trade contribution from each of the plurality of market participants to the capital requirement reduction resulting from a compression portfolio;

determining, by the controller, one or more of a minimum value and a maximum value of zero or more risk constraints on the compression portfolio, wherein each of the zero or more risk constraints are applicable to all or a subset of compression positions associated with one or more market participants;

determining, utilizing the controller, a set of trades between the plurality of market participants that delivers capital requirement reduction to each of the plurality of market participants, the set of trades satisfying all constraints specified by each of the plurality of market participants;

generating, utilizing the controller, for each of the plurality of market participants, a time period to review and approve compression portfolios prior to consummating the set of trades;

generating, utilizing the controller, one or more portfolios for selection and presentation to the plurality of market participants at an end of the time period, the one or more portfolios comprising data indicative of the risk exposure constraints for the plurality of market participants;

clearing and reporting the set of trades, using the computer, in response to unanimous approval by the plurality of market participants;

determining, by the controller, trade match data representative of opportunities to trade with individual counterparties on each position remaining in a portfolio belonging to at least one of the plurality of market participants; and transmitting, by the computer, the trade match data to the plurality of market participants in response to clearing and reporting the set of trades.

20. The one or more non-transitory computer storage media of claim 19, further comprising deploying a plurality of computational algorithms running in parallel to reduce the time required to derive candidate compression portfolios.

* * * * *

UNITED STATES PATENT AND TRADEMARK OFFICE
CERTIFICATE OF CORRECTION

| | | |
|---|---|---|
| PATENT NO. | : 11,823,264 B1 | |
| APPLICATION NO. | : 17/350815 | |
| DATED | : November 21, 2023 | |
| INVENTOR(S) | : Brett Johnson et al. | |

It is certified that error appears in the above-identified patent and that said Letters Patent is hereby corrected as shown below:

In the Claims

Column 10, Line 55, Claim 1, before "generating" delete "providing"

Signed and Sealed this
Nineteenth Day of March, 2024

*Katherine Kelly Vidal*

Katherine Kelly Vidal
*Director of the United States Patent and Trademark Office*